June 28, 1966   K. SENNEWALD ET AL   3,258,482
PROCESS FOR THE MANUFACTURE OF PURE, CONCENTRATED
ACETIC ACID FROM THE REACTION MIXTURE
OBTAINED BY PARAFFIN OXIDATION
Filed Nov. 23, 1962
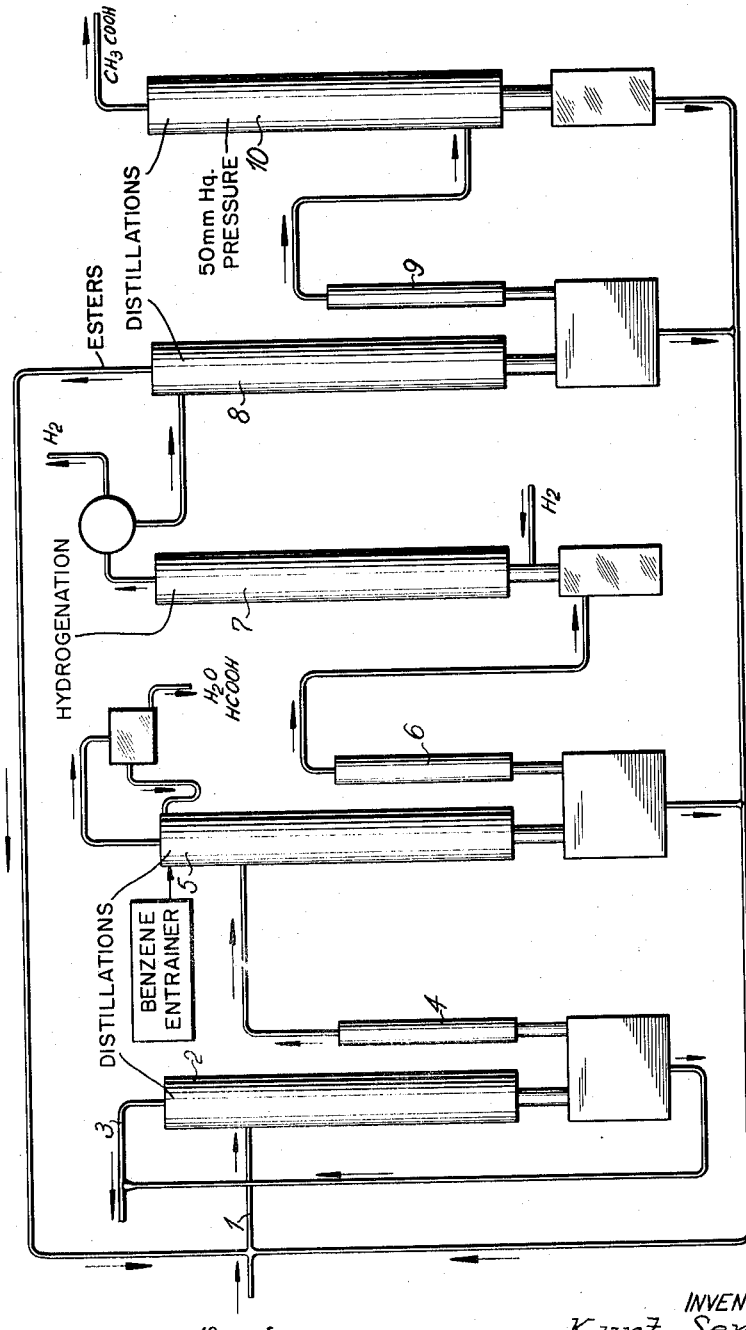
INVENTORS
Kurt Sennewald
Wilhelm Vogt
Heinz Erpenbach
Herbert Joest
BY Connolly and Hutz
ATTORNEYS

United States Patent Office 3,258,482
Patented June 28, 1966

3,258,482
PROCESS FOR THE MANUFACTURE OF PURE, CONCENTRATED ACETIC ACID FROM THE REACTION MIXTURE OBTAINED BY PARAFFIN OXIDATION
Kurt Sennewald and Wilhelm Vogt, Knapsack, near Cologne, Heinz Erpenbach, Surth, near Cologne, and Herbert Joest, Cologne-Sulz, Germany, assignors to Knapsack-Griesheim Aktiengesellschaft, Knapsack, near Cologne, Germany, a corporation of Germany
Filed Nov. 23, 1962, Ser. No. 239,498
Claims priority, application Germany, Nov. 25, 1961, K 45,285
7 Claims. (Cl. 260—541)

The present invention relates to a process for the manufacture of pure, concentrated acetic acid from the aqueous mixture obtained by oxidizing aliphatic hydrocarbons in the liquid phase by subjecting this mixture to distillation.

This mixture contains low molecular weight fatty acids, such as formic acid, acetic acid, propionic acid, butyric acid and succinic acid and, in addition thereto, alcohols, esters, carbonyl compounds, unreacted hydrocarbons and water. The proportion in which each of these individual constituents is obtained, vary depending on the starting material subjected to oxidation and on the reaction conditions observed during the oxidation. Quite generally, aliphatic hydrocarbons of low molecular weight and boiling at temperatures of up to about 130° C. are oxidized by means of oxygen or oxygen-containing gases.

During the work up of this mixture, it is especially difficult to isolate pure, concentrated acetic acid, the difficulties being due to esters and carbonyl compounds which boil within the boiling range of acetic acid and can only be isolated by known processes in several long columns at great reflux ratios to a limit that can no longer be determined by analysis.

The disadvantages offered by this process reside in the plurality of the columns used, the great reflux, the relatively low permanganate stability and the obligatory batchwise distillation of the acetic acid for its final purification.

It is known that the permanganate time of this acetic acid can be increased to more than 2 hours by hydrogenating it over noble metal catalysts. The exclusive use of costly noble metal catalysts is, however, disadvantageous and so is the fact that the hydrogenation does not result in the formation of chemically pure acetic acid, the hydrogenation products being retained in the acetic acid.

The present invention unexpectedly provides a process which enables all the aforesaid disadvantages to be overcome with the aid of an energetically less expensive distillation apparatus with the resultant formation of pure acetic acid which complies with the requirements as to purity as set forth in the "Deutsche Arzneibuch 6" (German pharmacopeia).

In the process of the present invention, any constituent distilling over at a temperature below the boiling point (106° C.) of the water/formic acid/acetic acid azeotrope is first removed from the reaction mixture and the above-mentioned aqueous acid mixture is then withdrawn as the vapor phase over the sump of the very same distilling column. The products obtained respectively at the head and the sump of the distilling column are then returned to the oxidizing zone.

The aqueous acid mixture is introduced into a second distilling stage, wherein the water and the formic acid are subjected to common azeotropic distillation using benzene as an entraining agent and thereby separated at the head of said second distilling stage, and the highly concentrated acetic acid so purified is removed as the vapor phase at a position above the still of the distilling column. The acid so produced already complies with the requirements demanded of commercial acetic acid but it has a relatively short permanganate time.

The stability of the acid to permanganate is increased by hydrogenating the acetic acid by using noble metal catalysts or simple hydrogenation catalysts, such as nickel deposited on oxidic carriers. The carbonyl compounds which are responsible for the short permanganate time, are thereby converted into alcohols as established by analysis.

The alcohols produced during the hydrogenation undergo esterification in the following distilling process with the large excess of acetic acid with the resultant formation of esters, which are separated from the acetic acid by removing a small portion of the acetic acid coming from the hydrogenating stage and flowing into the distilling stage at the top portion of the distilling stage together with the low-boiling esters and by removing the bulk of the acid as the vapor phase at a position above the sump of the distilling stage. The acetic acid so produced is admittedly "chemically pure" but it does not comply with first class requirements as regard its content of esters.

The acetic acid should therefore be subjected to a further purifying distillation which is preferably carried out in vacuo. The purified acetic acid is withdrawn at the top portion of the purifying distilling stage, the traces of higher-boiling esters included in the feed remaining in the product obtained in the sump of the purifying distilling stage.

The present invention relates more particularly to a process for the manufacture of pure, concentrated acetic acid from the aqueous mixture obtained by oxidizing aliphatic hydrocarbons in the liquid phase by distillation, wherein the mixture is distilled in a first distilling stage with the removal of all constituents distilling over at a temperature below the boiling point of 106° C. of the water/formic acid/acetic acid azeotrope at the top portion of the first distilling stage and with the removal of the aqueous acid mixture as the vapor phase at a position above the sump portion of the first distilling stage, the aqueous acid mixture is introduced into a second distilling stage in which a water/formic acid/benzene fraction is separated azeotropically at the top portion of the second distilling stage by adding benzene as the entrainer, and the remaining highly concentrated acetic acid is removed as the vapor phase at a position above the sump of the second distilling stage.

The products obtained respectively at the top or sump portion of the first distilling stage are preferably returned to the oxidizing stage.

The highly concentrated acetic acid is further purified by catalytical hydrogenation over noble metal catalysts or over nickel deposited on an oxidic carrier, the carbonyl compounds as the contaminants of the acid being reduced to alcohols.

A small proportion, preferably less than 15%, of the acetic acid coming from the hydrogenating stage and introduced into a third distilling stage is removed at 115° C. together with low-boiling contaminants at the top portion of the third distilling stage while the bulk thereof is removed as the vapor phase at a position above the sump of the third distilling stage.

The chemically pure acetic acid removed in vapor form above the sump of the third distilling stage is still further purified in a fourth purifying distilling stage, the acetic acid obtained as the head product of the fourth distilling zone complying with the requirements set forth in the "German Arzneibuch 6" (German pharmacopeia).

The distillation in the fourth stage can be carried out under reduced pressure.

The products obtained in the sump portions respectively of the second to fourth stages and the head product of the third distilling stage are advantageously cycled and thereby returned to the first distilling stage.

The water/formic acid/benzene fraction distilling over at the top portion of the second distilling stage is separated into two phases, the aqueous formic acid is isolated and the upper phase, which consists of benzene, is returned to the second distilling stage.

The following example serves to illustrate the invention, but it is not intended to limit it thereto, the apparatus used being illustrated diagrammatically in and described with reference to the accompanying drawing.

*Example*

A paraffinic hydrocarbon fraction boiling at a temperature of 25° to 100° C. was oxidized in the liquid phase with air at a temperature of 180° C. and under a pressure of 45 atmospheres (gage). The resulting reaction mixture was introduced continuously through line 1 into distilling column 2 provided with 23 theoretical trays (first distilling stage), the column being operated at a head temperature of 65° C. and at a still temperature of 150° C. All the constituents (35% of the feed) boiling at a temperature lower than the boiling point (106° C.) of the water/formic acid/acetic acid azeotrope were removed through line 3 in the form of a mixture boiling azeotropically at 65° C., while the aqueous, monocarboxylic acid fraction (50% of the feed) as the vapor phase was conveyed from the bottom of the column and via a laterally disposed column 4 provided with 10 theoretical trays and operated at a head temperature of 106° C. to distilling column 5 (second distilling stage). The head product (35%) and the sump product (15% of the feed) obtained in column 2 were returned through line 3 to the oxidizing stage.

In the likewise continuously operated distilling column 5 provided with 36 trays, the water and the formic acid were removed as the head fraction at a temperature of 69° C. and at a sump temperature of 140° C. while adding benzene as the entrainer; the layers were separated, the lower layer of aqueous formic acid (35% of the feed) was removed and the upper benzene layer was returned to column 5. The highly concentrated acetic acid (55% of the feed) was removed in vapor form at the bottom of column 5 through a likewise laterally disposed column 6 provided with 6 trays and operated at a head temperature of 119° C. and then supplied in vapor form to the hydrogenating column 7. The product obtained in the still (10% of the feed) of column 5 was returned to column 2. The hydrogenation was carried out at a temperature of 150° C. The catalysts used were platinum deposited on coal, platinum deposited on silica gel, nicked deposited on oxidic carrier, such as $Al_2O_3$ or $SiO_2$, optionally contaminated with alkali metal oxides, for example $Na_2O$ or $K_2O$. The hydrogenating effect obtained was practically equally good in all cases immaterial of the catalyst used. With each catalyst, the throughput was 500 g. acetic acid per liter of catalyst an hour. The use of nickel as compared with the costly platinum was especially economic.

The hydrogenation product was conveyed to distilling column 8 (third distilling stage) provided with 30 trays and operated at a head temperature of 115° C. and at a still temperature of 130° C. 8% of the feed were obtained as the head product and likewise 8% of the feed were obtained as the still product, which were both returned to column 2. 84% of the feed were removed in vapor form at the bottom portion of column 8 through a laterally disposed column 9 provided with 9 trays and operated at a head temperature of 118° C. and introduced into purifying column 10 (fourth distilling stage) provided with 30 trays. Column 10 was operated under a reduced pressure of 50 mm. mercury at a head temperature of 48° C. and at a still temperature of 62° C. 10% of the feed were returned as the still product of column 10 to column 2 and 90% of the feed were obtained at the top portion of column 10 in the form of pure acetic acid. The acid was analyzed and the following data, for example, were obtained:

| | |
|---|---|
| Dilution with water | Clear |
| Permanganate time,[1] hrs. | >3 |
| Acetic acid, percent | 99.8 |
| Formic acid, percent | <0.01 |
| Ester, percent | <0.02 |
| Aldehyde, p.p.m. | <2 |
| Benzene, p.p.m. | <10 |
| Water, percent | 0.18 |
| Chloride, p.p.m. | <1 |
| Sulfate, p.p.m. | <2 |
| Heavy metals, p.p.m. | <0.1 |
| Solidification point, °C | 16.4 |

[1] The term "permanganate time" is intended to mean that period within which no color change is produced in the red-violet solution of 20 parts aqueous acetic acid (6 parts acetic acid and 14 parts water) with 1 part 0.1% potassium permanganate solution.

We claim:

1. A process for the manufacture of pure concentrated acetic acid from an aqueous mixture obtained by oxidizing aliphatic hydrocarbons in the liquid phase by distilling said mixture and adding an entrainer for water and formic acid with subsequent catalytical hydrogenation on catalysts which comprises separating from the mixture in a first distilling stage and at the top portion of said distilling stage all constituents distilling over at a temperature below the boiling point of 106° C. of a water/formic acid/acetic acid azeotrope, removing the said azeotrope as vapor phase from the bottom of said first distilling stage and introducing said azeotrope into a second distilling stage; returning products obtained at the top portion and in the sump of said first distilling stage to an oxidizing stage; separating azeotropically at the top portion of said second distilling stage of a water/formic acid/benzene fraction while adding benzene as an entrainer; removing remaining highly concentrated acetic acid as vapor phase from the bottom of said second distilling stage and further purifying it by hydrogenation on a catalyst selected from the group consisting of noble metals and nickel, carbonyl compounds included in the acetic acid as contaminants being thereby reduced to alcohols; introducing the acetic acid coming from the hydrogenating stage via a cooling zone into a third distilling stage and removing a small portion of said acetic acid at the head of said third distilling stage at a temperature of about 115° C. together with low-boiling contaminants; removing the bulk of the now chemically pure acetic acid as vapor phase from the bottom of said third distilling stage and further purifying it in a fourth distilling stage.

2. A process as claimed in claim 1, wherein platinum is used as the noble metal catalyst, the platinum being deposited on a carrier selected from the group consisting of coal and silica gel.

3. A process as claimed in claim 1, wherein nickel deposited on an oxidic carrier selected from the group consisting of $Al_2O_3$ and $SiO_2$ is used as the catalyst.

4. A process as claimed in claim 1, wherein less than 15% of the acetic acid is removed at the head of the third distilling stage at a temperature of 115° C. together with low-boiling contaminants.

5. A process as claimed in claim 1, wherein the fourth distilling stage is operated at reduced pressure.

6. A process as claimed in claim 1, wherein the products in the sumps of the second to fourth distilling stages and the product obtained at the top portion of the third distilling stage are cycled and thereby returned to the first distilling stage.

7. A process as claimed in claim 1, wherein the water/formic acid/benzene fraction passing over as the head product of the second distilling stage is condensed and separated into two phases, the aqueous formic acid is removed and the upper phase consisting of benezene is returned to the second distilling stage.

References Cited by the Examiner
UNITED STATES PATENTS

| | | | |
|---|---|---|---|
| 1,804,745 | 5/1931 | Clarke et al. | 202—42 |
| 1,813,636 | 7/1931 | Petersen et al. | 202—42 |
| 2,038,865 | 4/1936 | Wentworth | 202—42 |
| 2,180,021 | 11/1939 | Stone | 202—56 X |
| 2,667,502 | 1/1954 | Steitz | 202—42 |
| 2,675,401 | 4/1954 | Laemmle | 260—540 |
| 2,884,451 | 4/1959 | Graham | 260—541 |
| 2,893,923 | 7/1959 | Luke et al. | 202—42 |
| 3,024,170 | 3/1962 | Othmer et al. | 202—42 |
| 3,041,373 | 6/1962 | Alders et al. | 260—541 |

NORMAN YUDKOFF, *Primary Examiner.*

F. E. DRUMMOND, W. L. BASCOMB,
*Assistant Examiners.*